April 24, 1934.   F. G. HUGHES   1,956,237
MOUNTING FOR SHAFTS
Original Filed Dec. 14, 1928   2 Sheets-Sheet 1

INVENTOR:
FREDERICK G. HUGHES,
BY Gales P. Moore
HIS ATTORNEY.

April 24, 1934.                F. G. HUGHES                1,956,237
                              MOUNTING FOR SHAFTS
              Original Filed Dec. 14, 1928        2 Sheets-Sheet 2

INVENTOR:
FREDERICK G. HUGHES,

BY *Gales P. Moore*

HIS ATTORNEY.

Patented Apr. 24, 1934

1,956,237

UNITED STATES PATENT OFFICE 1,956,237

MOUNTING FOR SHAFTS

Frederick G. Hughes, Bristol, Conn., assignor, by mesne assignments, to General Motors Corporation, Detroit, Mich., a corporation of Delaware Application December 14, 1928, Serial No. 326,040
Renewed April 14, 1931

31 Claims. (Cl. 74—424)

This invention relates to mountings for shafts and the like, being particularly applicable to pinion shafts of rear-axle driving-mechanisms of automobiles, and comprises all the features of novelty herein disclosed. It also formed subject-matter of my application Serial Number 488,303, filed October 13, 1930, in which I am claiming the bearing per se.

An object of the invention is to provide a simple and inexpensive mounting for such shafts and one wherein the adjustment of the pinion shaft can be accurately set and maintained. Another object is to provide a pinion shaft mounting in which the antifriction bearings and their assembly with housing parts are simplified.

Figure 2:
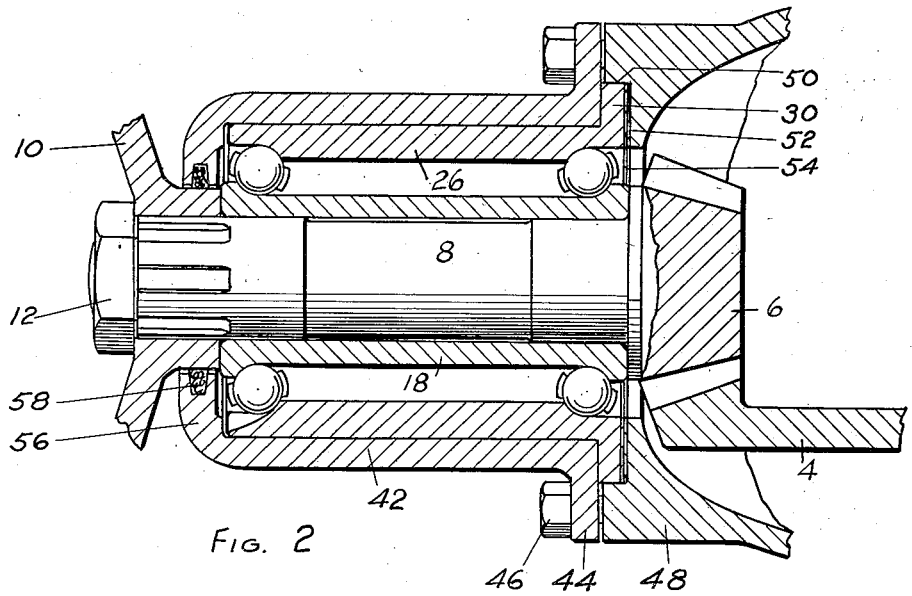
Figure 1:
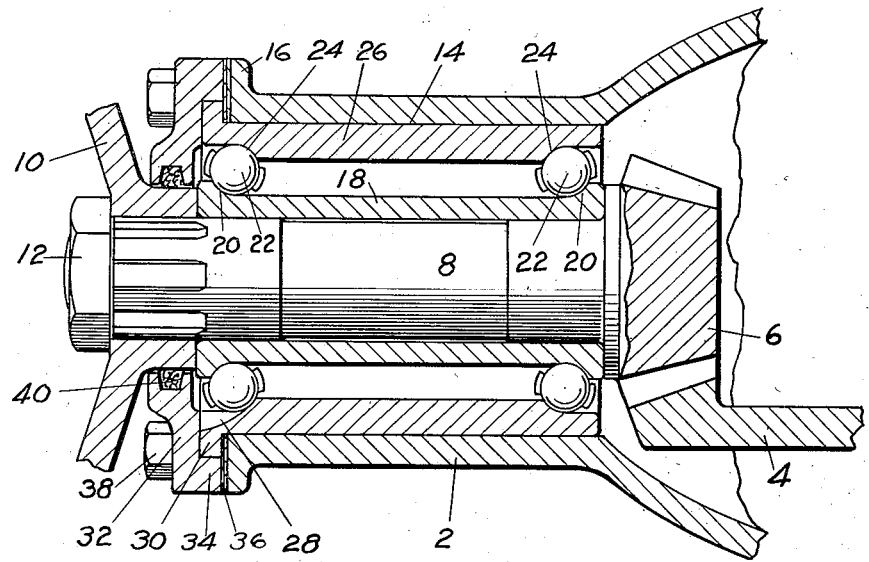
Figure 3:
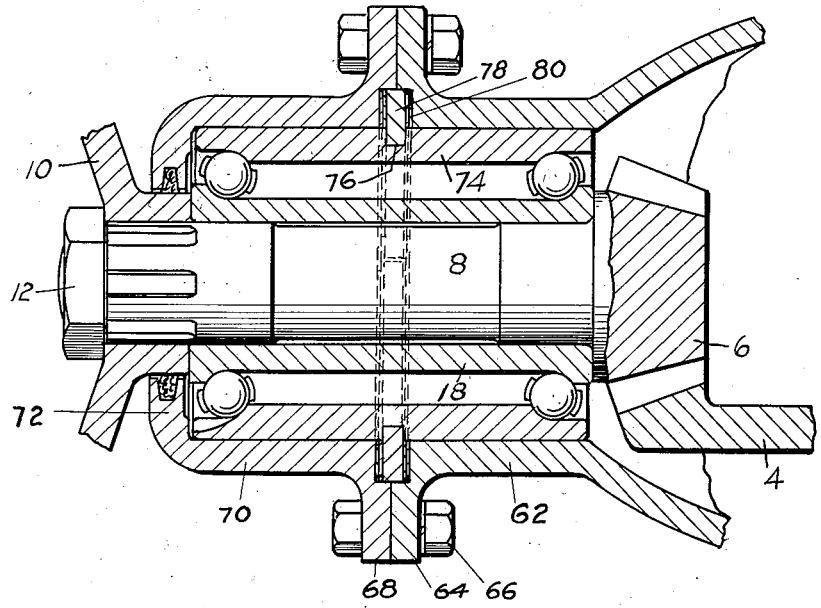
Figure 4:
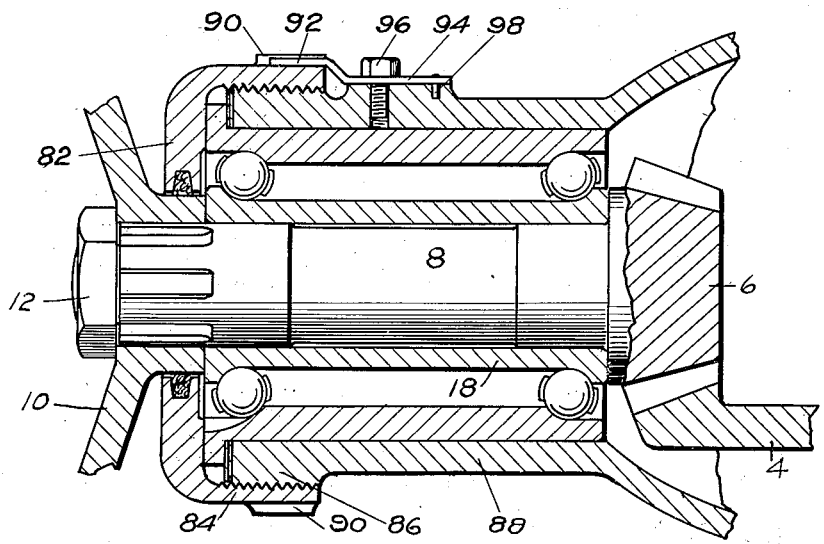

To these ends and to improve generally and in detail upon devices of this character, the invention further consists in the various matters herein disclosed and claimed. In its broader aspects, the invention is not necessarily limited to the specific construction selected for illustrative purposes in the accompanying drawings in which Figure 1 is a horizontal sectional view of a mounting for the pinion shaft of a rear axle driving mechanism and Figures 2, 3 and 4 are similar views of other embodiments of the invention.

Automobiles commonly have a differential-driving pinion at the rear end of a shaft mounted in axially movable antifriction bearings, one being a double-row bearing taking radial and axial load and one being a single-row bearing taking radial load, and the double-row bearing or both bearings being carried by an adjusting sleeve threaded in a housing extending forwardly from the rear axle casing and often split longitudinally so it can be contracted and clamped on the sleeve. The present invention eliminates one row of antifriction members, eliminates longitudinal splitting and internal threading of the housing, and rigidly maintains the adjustment and alignment of the pinion shaft.

The numeral 2 indicates a tubular carrier which projects forwardly from the usual rear axle housing. The usual ring gear 4 of the differential meshes with a drive pinion 6 which may be integral with the shaft 8 driven by a coupling disc or plate 10 which is keyed to the shaft and held by a nut 12 and functions as a retaining member. The carrier 2 is unbroken circumferentially and has a straight, smooth bore 14 extending out to its open end which is reinforced by an annular flange 16 which forms an annular abutment face at the end of a cylindrical bore. A long sleeve or inner race ring 18 extends between the pinion 6 and the retaining member 10 and is provided with angular contact raceways 20 facing towards one another for rolling elements, herein shown as balls 22. The balls engage angular contact raceways 24 on an outer sleeve or race ring 26 which has a filling slot 28 through which the second row of balls (the left hand row as here shown) can be inserted after the other row has been put in place by first extending the right hand end of the sleeve 18 beyond that end of the sleeve 26, placing the right hand row of balls against those two sleeves, and then sliding the sleeves back (upon the balls) to their working positions, it being my preference to facilitate the ball insertion by slightly radially expanding the outer sleeve by heat. The sleeve 26 is externally cylindrical for sliding adjustment in the bore 14 and has an annular flange 30 at one end overlapping the end face of the carrier 2.

An end cap or clamping ring 32 engages the end of the sleeve 26 and has a circular flange 34 fitting around the flange 30 and having its rear face flush with that of the flange 30 so that the rear faces of both flanges engage thin spacing plates or washers 36 of selected aggregate thickness. The plates are preferably split radially into two sections for convenient assembly and also bear on the end face of the carrier. Bolts 38 hold the cap or ring 32 to the tubular carrier, and a felt ring 40 in a groove of the ring engages the hub of the member 10 to retain lubricant.

When the bearing is assembled the balls are put under an initial thrust load so there will subsequently be minimum gear motion in any direction under driving load. The spacing washers are so selected as to thickness that the pinion 6 will have proper mesh with the ring gear 4 when the clamping ring is set up tight. This adjustment, made at the original assembly, is accurately and rigidly maintained and is not likely to be disturbed by unskillful persons. The rows of balls are spaced sufficiently widely apart to maintain the shaft alignment and take the radial and thrust loads usually taken by a double-row bearing and a single-row bearing. Thrust load created by the act of driving the gear 4 is taken by the rearward row of balls and transmitted through the sleeve 26 to the clamping ring 32. The flange 30 prevents movement of the sleeve in the other direction. Accurate shaft alignment is insured by the solid or unsplit nature of the carrier 2, which is not subject to distortion by endwise clamping, and the straight bore 14 is easily machined and needs no threading. No separate sleeve other than the long outer race-ring 26 is required to provide for the longitudinal adjustment of the pinion shaft and more radial space is accordingly available for the bearing.

The above-mentioned initial load under which the balls 22 were placed when the bearing itself was assembled holding these balls under compression between their respective sets of cooperating races even when the bearing is free from extraneous load produced by the driving action of the gears on each other, when such extraneous load occurs not only do the already-compressed balls most effectively resist any axial or radial displacement between the shaft 8 and its casing 2 (and, consequently, between the pinion 6 and its gear 4), but also even should the driving-load be great enough to cause further ball compression upon a given side of the bearing (either axially or radially) so that there is some slight further separation, at the other side of the bearing, between cooperating races of a set, the balls of that set expand in their natural effort to regain their normal, unloaded diameters and thus maintain contact with their races with continued steadying pressure so that there is stable support between the shaft and its casing under all normal extraneous loads and wabbling and chattering is prevented. Thus, this initial loading of the balls (usually to an amount ranging from about five percent to about fifteen percent of the rated thrust-sustaining capacity of the bearing at normal operating speed) holds the gears and their supports against relative movement and chatter during the running of the driving mechanism.

Further security of firmness between the shaft 8 and its support 2 (and, consequently, between the pinion 6 and the gear 4) results from the fact that the angularly-set races have the balls contacting with them in lines that approach each other as they proceed away from the shaft 8. The load that comes upon the bevelled pinion 6 when turning its meshing gear 4 tends to push that pinion upwardly to the left, as the parts are shown in Figure 1, and, therefore, tends to cause the left-hand end of the shaft 8 to swing downwardly and to the right, the shaft tending to pivot on the upper ball of the right-hand row; but the lower portion of the left-hand, angularly-set race 24 curving upwardly and inwardly and extending directly across the path of the lower, left-hand balls solidly resists any such movement.

As my present structure eliminates one row of anti-friction members from the mountings heretofore used in automobiles, I am enabled to shorten the pinion shaft and the extension of the axle-housing and to thereby reduce the tendency to oscillate or whip up and down. Also, the shims, 36, are easily accessible and shims of various numbers and sizes can be readily substituted for others, so that adjustment between the pinion and its ring-gear (as in the initial assembling of the automobile) can be quickly and conveniently made.

In Fig. 2, a tubular carrier 42 is formed with an outwardly extending flange or clamping ring 44 detachably connected by bolts 46 to a rear axle casing 48. The outer race ring or sleeve 26 has its end flange 30 fitting in a cylindrical recess 50 in the axle casing and resting at one side against the flange or clamping ring 44. The outer face of flange 30 abuts against thin spacing plates or washers 52 of selected aggregate thickness placed in the recess and preferably split radially as indicated at 54 for assembly reasons. The carrier 42 has an end wall 56 provided with a recess for a sealing washer 58 engaging the hub of the plate 10. When re-adjusting the pinion shaft, the bolts 46 and nut 12 are removed and the assembled carrier, bearing and pinion shaft moved axially for access to the washers.

In Fig. 3, a tubular carrier 62 projects from the rear axle casing and is provided with a smooth unbroken bore extending out to an end flange 64 clamped by bolts 66 to a flange 68 on an extension carrier or cap 70 having an inturned end wall or flange 72. In this case, the race ring or sleeve 74 has no end flange but is provided with a central annular recess 76 receiving a locating flange in the form of a two-piece ring 78 which extends out into mating recesses in the meeting flanges 64 and 68. Thin spacing plates or washers 80 of selected aggregate thicknesses are placed on opposite sides of the two-piece ring 78 in the mating recesses of the carrier members and are clamped therein by the bolts 66. The spacing plates are preferably split radially for assembly reasons and, by proper selection, can effect the desired axial location of the outer race ring or sleeve 74 and consequently of the pinion. The aggregate thickness of the spacing plates can be kept constant even at various adjustments by transferring a selected thin spacing plate from one side of the two-piece ring 78 to the other and this enables the flanges 64 and 68 to always meet for retaining lubricant. The ring 78 fits the sides of the annular recess 76 and coacts with the spacing plates to form a locating flange for holding the sleeve 74 against endwise movement in the bore of the carrier.

Fig. 4 is similar to Fig. 1 but the end cap or clamping ring 82 is provided with a threaded flange 84 engaging a threaded boss or flange 86 on the carrier 88. The flange 84 has a multiplicity of lugs 90 forming notches one of which is engaged by a locking finger 92 on a plate 94 secured to the carrier 88 by a screw 96 and pin 98.

Thus, my present mounting comprises but few elements and effectively supports the parts. Although here shown as applied to the pinion shaft of an automobile differential driving mechanism it is obvious that it can be effectively used in other places.

I claim:

1. In an axle construction having a pinion shaft subject to end thrust, a tubular carrier projecting from the axle and having a smooth unbroken bore extending to its end, a flange at the end of the tubular carrier, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, an outer sleeve slidably fitted in the bore and having raceways near its ends for the rolling elements, the sleeve also having a flange at one end overlapping the flange of the tubular carrier, spacing members removably interposed between the flanges, and means for rigidly clamping the flange of the sleeve against the spacing members; substantially as described.

2. In an axle construction having a pinion shaft subject to end thrust, a tubular carrier projecting from the axle and having a smooth unbroken bore extending to its end, a flange at the end of the tubular carrier, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, an outer sleeve slidably fitted in the bore and having raceways near its ends for the rolling elements, the sleeve also having a flange at one end overlapping the flange of the tubular carrier, spacing members removably interposed between the flanges, a ring engaging the end of the outer sleeve, and means for holding said ring to the end of the tubular carrier; substantially as described.

3. In an axle construction having a pinion shaft subject to end thrust, a tubular carrier projecting from the axle and having a smooth bore extending to its end, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, an outer sleeve slidably fitted in the bore and having angular contact raceways integrally formed therewith near the ends to place an initial thrust load on the rolling elements, and means for adjustably clamping the outer sleeve against axial movement in the tubular carrier; substantially as described.

4. In an axle construction having a pinion shaft subject to end thrust, a tubular carrier projecting from the axle, a pinion at one end of the shaft and a driving member at the other, a long sleeve fixed on the shaft and extending from the pinion to the driving member, an angular contact raceway at the end of the sleeve adjacent to the pinion and a raceway at the end of the sleeve adjacent to the driving member, rolling elements running on the raceways, outer angular contact raceways spaced widely apart in the tubular carrier, spacing washers engaging the carrier, and a clamping ring at the open end of the carrier for securing the assembled bearing and pinion shaft in axially adjusted position in the carrier; substantially as described.

5. In an axle construction having a pinion shaft subject to end thrust, a tubular carrier projecting from the axle and having a smooth cylindrical bore, a sleeve on the shaft, a pinion on the shaft at one end of the sleeve, a retaining member on the shaft and engaging the other end of the sleeve, an angular contact raceway at the end of the sleeve adjacent to the pinion and an angular contact raceway at the end of the sleeve adjacent to the retaining member, rolling elements running on the raceways, an outer sleeve slidably fitted in the bore and having angular contact raceways integral therewith, the tubular carrier having an abutment face at one end of the cylindrical bore, spacing plates interposed between the abutment face and a face of the outer sleeve, and means engaging the outer sleeve for clamping said face of the sleeve against the spacing plates; substantially as described.

6. In an axle construction having a pinion shaft subject to thrust and radial load, a tubular carrier on the axle and having a smooth unbroken bore extending to its end, a flange at the end of the tubular carrier, a pinion at one end of the shaft and a bearing retaining member spaced therefrom, a long sleeve fixed on the shaft and extending from the pinion to the retaining member, an angular contact raceway at the end of the sleeve adjacent to the pinion and an angular contact raceway at the end of the sleeve adjacent to the retaining member, rolling elements running on the raceways, an outer sleeve slidably fitted in the bore and having raceways for the rolling elements, the sleeve also having a flange at one end overlapping the flange of the tubular carrier, spacing means of selected thickness removably interposed between the flanges, and means for rigidly clamping the flange of the sleeve against the spacing means; substantially as described.

7. In an axle construction having a pinion shaft subject to thrust and radial load, a tubular carrier on the axle and having a smooth unbroken bore extending to its end, a flange at the end of the tubular carrier, a pinion at one end of the shaft and a bearing retaining member spaced therefrom, a long sleeve fixed on the shaft and extending from the pinion to the retaining member, an angular contact raceway at the end of the sleeve adjacent to the pinion and an angular contact raceway at the end of the sleeve adjacent to the retaining member, rolling elements running on the raceways, an outer sleeve slidably fitted in the bore and having raceways for the rolling elements, the sleeve also having a flange at one end overlapping the flange of the tubular carrier, spacing means of selected thickness removably interposed between the flanges, a ring engaging the end of the outer sleeve, and means for holding said ring to the end of the tubular carrier; substantially as described.

8. In an axle construction having a pinion shaft subject to thrust and radial load, a tubular carrier on the axle and having a smooth bore extending to its end, a pinion at one end of the shaft and a bearing retaining member spaced therefrom, a long sleeve fixed on the shaft and extending from the pinion to the retaining member, an angular contact raceway at the end of the sleeve adjacent to the pinion and an angular contact raceway at the end of the sleeve adjacent to the retaining member, rolling elements running on the raceways, an outer sleeve slidably fitted in the bore and having spaced angular contact raceways integrally formed therewith and constructed to place an initial thrust load on the rolling elements, and means for adjustably clamping the outer sleeve against axial movement in the tubular carrier; substantially as described.

9. In an axial construction having a pinion shaft subject to thrust and radial load, a tubular carrier on the axle and having a smooth unbroken bore extending to its end, a flange at the end of the tubular carrier, a sleeve fixed on the shaft and having widely spaced angular contact raceways, an outer sleeve slidably fitted in the bore and having cooperating raceways, two rows of rolling elements running on the raceways, the outer sleeve having a locating flange overlapping the flange of the tubular carrier, spacing means of selected thickness removably interposed between the flanges, and means for rigidly clamping the flange of the sleeve against the spacing means; substantially as described.

10. In an axle construction having a pinion shaft subject to thrust and radial load, a tubular carrier on the axle, a pinion at one end of the shaft and a bearing retaining member spaced therefrom, a long sleeve fixed on the shaft and extending from the pinion to the retaining member, an angular contact raceway at the end of the sleeve adjacent to the pinion and a raceway at the end of the sleeve adjacent to the retaining member, rolling elements running on the raceways, outer angular contact raceways spaced widely apart in the tubular carrier, spacing means of selected thickness engaging the carrier, and a clamping ring at the open end of the carrier for securing the assembled bearing and pinion shaft in axially adjusted position in the carrier; substantially as described.

11. In an axle construction having a pinion shaft subject to end thrust, a tubular carrier on the axle and having a smooth cylindrical bore, a sleeve on the shaft, a pinion on the shaft at one end of the sleeve, a retaining member on the shaft and engaging the other end of the sleeve, an angular contact raceway at the end of the sleeve adjacent to the pinion and an angular contact raceway at the end of the sleeve adjacent to the retaining member, rolling elements running on the raceways, an outer sleeve slidably fitted in the bore and having angular contact raceways integral therewith, the tubular carrier having an abutment face at one end of the cylindrical bore, spacing means of selected thickness interposed between the abutment face and a face of the outer sleeve, and means engaging the outer sleeve for clamping said face of the sleeve against the spacing means; substantially as described.

12. The combination with relatively rotatable parts one of which is adapted to be subjected to extraneous load, of two races upon each of said parts, and rolling-elements between the respective sets of said races and under compression therebetween when free from load extraneous to the said races and rolling-elements; substantially as described.

13. The combination with relatively rotatable parts one of which is adapted to be subjected to extraneous load, of two races substantially fixedly spaced upon each of said parts, and rolling-elements between each set of cooperating said races and of normal diameter greater than the distance between their cooperating races; substantially as described.

14. The combination with relatively rotatable parts one of which is adapted to be subjected to extraneous load, of two races substantially fixedly spaced upon each of said parts, and rolling-elements engaging cooperating sets of said races in angularly opposed lines and under compression between their races when free from extraneous load; substantially as described.

15. The combination with a casing, and a spindle therein adapted to be subjected to extraneous load, of two angular-contact races upon each of said parts, and rolling-elements between the respective cooperating sets of said races, said rolling elements engaging said races in lines which approach each other as they proceed away from said spindle and being under compression between their races when free from extraneous load; substantially as described.

16. The combination of a shaft subject to load, a housing, an outer race ring clamped in the housing and having a pair of angular contact raceways, two rows of rolling elements running on the raceways, and an inner race ring sleeved on the shaft and having angular contact raceways, the rolling elements being larger than the space between cooperating raceways to produce an initial internal load; substantially as described.

17. The combination of a shaft subject to load, a housing, an outer race ring clamped in the housing and having a pair of angular contact raceways, two rows of rolling elements running on the raceways, and an inner race ring sleeved on the shaft and having angular contact raceways one of which is adjacent to the point of application of the load and the other of which is spaced from the first so that the contact angles diverge towards the axis of the shaft, the rolling elements being assembled in their raceways under such initial load that they remain in contact with their raceways to maintain the shaft alignment when the shaft receives its load; substantially as described.

18. In an automobile drive or the like, the combination with the driving gear, its casing, and a drive-shaft within said casing and carrying at its end a gear engaging said first-mentioned gear, of an angular-contact double-row bearing between said shaft and said casing and having its rolling-elements of greater normal diameter than is the normal distance between their races and contacting with said races in lines that approach each other as they proceed radially away from the said shaft; substantially as described.

19. In an automobile drive or the like, the combination with a wheel-driving gear, its casing provided with an abutment, and a drive-shaft within said casing and carrying at its end a gear which engages said first-mentioned gear and projects radially beyond said shaft to produce a shoulder therewith, of an angular-contact double-row bearing between said shaft and said casing and having its cone-member adjacent said shoulder at one end, a clamping-member at the other end of said cone-member and secured to said shaft and clamping said cone-member between it and said shoulder, and a clamping-member secured to said casing and clamping the cup member of said bearing between said second-mentioned clamping-member and said abutment, the rolling elements of said bearing being of normally greater diameter than is the normal distance between their races and contacting with said races in lines that approach each other as they proceed away from the said shaft; substantially as described.

20. The combination with a wheel-support and a wheel-driving gear, of a casing connected to said support, a shaft within said casing and carrying a gear interengaging with said wheel-driving gear and projecting radially beyond said shaft to produce a shoulder therewith, a unitary, bearing cone-member about said shaft and adjacent said shoulder and provided with two races spaced from each other longitudinally of the shaft, clamping means engaging said shaft and acting upon the end of said cone-member remote from said shoulder to clamp said cone-member against said shoulder, a unitary, bearing cup-member within said casing and provided with two races spaced from each other longitudinally of said shaft, means for holding said cup-member against longitudinal movement with respect to said casing, and rolling-members between said races of said cup-member and said cone-member, the respective rows of said rolling-members engaging their races in lines that approach each other as they proceed away from said shaft; substantially as described.

21. The combination with a wheel-support, a wheel-driving gear, a shaft carrying a gear interengaging said wheel-driving gear and projecting radially about said shaft to produce a shoulder, a shaft-driving member, and means for clamping said shaft-driving member to said shaft, of a casing about said shaft and provided with a shoulder, a unitary, bearing cup-member in said casing and provided with two races spaced from each other longitudinally of said shaft, a clamping-member fastened to said casing and clamping said cup-member against said shoulder of said casing, a unitary, bearing cone-member about said shaft and provided with two races spaced from each other longitudinally of said shaft, said cone-member extending between said shaft-driving member and the said shoulder produced by said gear and being clamped between said parts by said clamping means, and rolling-members in said races, the respective rows of said rolling-members engaging their races in lines that approach each other as they proceed away from said shaft; substantially as described.

22. The combination with inter-engaging gears, one of which is carried by a shaft, and a casing about said shaft and provided with an abutment-surface, of an anti-friction bearing between said shaft and casing, means for holding the cone-member of said bearing to said shaft against longitudinal movement with respect thereto, the cup-member of said bearing being in said casing, shim-means between said cup-member and said abutment-surface of said casing for spacing said bearing and its connected gear with relation to the other said gear, and clamping means engaging said casing and holding said cup-member and said shim-means in position; substantially as described.

23. The combination with inter-engaging gears, one of which is carried by a shaft beyond which it radially projects to produce a shoulder, clamping means engaging said shaft, and a casing about said shaft and provided with an abutment-surface, of an antifriction bearing having its cone-member about said shaft and clamped against said shoulder by said clamping means, the cup-member of said bearing being within said casing, shim-means between said cone-member and said abutment-surface to space said bearing and its connected gear with relation to the other said gear, and clamping means engaging said casing and holding said cup-member and said shim-means in position; substantially as described.

24. In an axle construction or the like having a shaft subject to load, a tubular carrier on the axle and having a smooth cylindrical bore, a gear at one end of the shaft and a bearing-retaining member spaced therefrom, angular contact inner raceways held between the said gear and the retaining member, two rows of rolling elements running on the raceways, an outer race sleeve having angular contact raceways, the sleeve being slidably fitted in the bore of the carrier, one of said last members having a locating flange and the other having an opposing end face, spacing means of selected thickness between the flange and the face, and means for clamping the sleeve in the position determined by the spacing means; substantially as described.

25. In an axle construction or the like having a shaft subject to load, a tubular carrier on the axle and having a smooth cylindrical bore extending to its end, an abutment face on the carrier at the end of the bore, a gear at one end of the shaft and a bearing retaining member spaced therefrom, angular contact inner raceways held between the said gear and the retaining member, two rows of rolling elements running on the raceways, an outer race sleeve slidably fitted in the bore of the carrier and having an integral outwardly extending locating flange overlapping the abutment face of the carrier, spacing means of selected thickness between the abutment face and the locating flange, and means for securing the sleeve to the carrier in the position determined by the spacing means; substantially as described.

26. In an axle construction or the like having a shaft subject to load, a tubular carrier on the axle and having a smooth cylindrical bore, a gear at one end of the shaft and a bearing retaining member spaced therefrom, a long sleeve fixed on the shaft and extending from the gear to the retaining member, an angular contact raceway at the end of the sleeve adjacent to the gear and an angular contact raceway at the end of the sleeve adjacent to the retaining member, rolling elements running on the raceways, an outer race sleeve having angular contact raceways, the sleeve being slidably fitted in the bore of the carrier, one of said last members having a locating flange and the other having an opposing end face, spacing means of selected thickness between the flange and the face, and means for clamping the sleeve in the position determined by the spacing means; substantially as described.

27. The combination of inter-engaging bevel gears, and a casing, of two rows of rolling-elements serving as support between said casing and one of said gears and making angular contact with their races, said rolling-elements being under such compression when their said gear is free from extraneous load that when normal load is applied they continue to engage their races; substantially as described.

28. The combination with relatively rotatable parts adapted to be subjected to load by work, of a unitary race-member upon one of said parts and having two raceways therein, a cooperating raceway-element for each of said raceways and upon the other of said parts, and rolling-elements between each said set of raceways and held in such crowded engagement therewith by force acting in the general direction of the axis of rotation that engagement between said parts remains intact when subjected to normal load of such work; substantially as described.

29. In an automobile drive or the like, the combination with the driving-gear and casing, of a shaft within said casing, a pinion upon said shaft and meshing with said gear, and a bearing between said shaft and said casing, said bearing having two rows of rolling elements adapted to sustain thrust and radial load and being under compression between their race-members when free from extraneous load; substantially as described.

30. In an automobile drive or the like, the combination with the driving-gear and casing, and a shaft within said casing and provided with a pinion meshing with said gear, of two races upon each of said casing and said shaft, and rolling-elements between the respective sets of said races and under compression therebetween when free from load extraneous to the said races and rolling-elements; substantially as described.

31. In an automobile drive or the like, the combination with the driving-gear and casing, and a shaft within said casing and provided with a pinion meshing with said gear, of a double-row bearing between said shaft and casing and embodying race-members combined with rolling-elements that are under compression between their co-operating races when free from load extraneous to said races and rolling-elements; substantially as described.

FREDERICK G. HUGHES.